M. DOLIVO-DOBROWOLSKY.
ELECTRIC MOTOR.
APPLICATION FILED MAR. 25, 1914.

1,227,400.

Patented May 22, 1917.

WITNESSES:
Anthony Mark.
J. Ellis Glen

INVENTOR:
MICHAEL DOLIVO-DOBROWOLSKY.
BY
HIS ATTORNEY.

UNITED STATES PATENT OFFICE.

MICHAEL DOLIVO-DOBROWOLSKY, OF WILMERSDORF, GERMANY, ASSIGNOR TO GENERAL ELECTRIC COMPANY, A CORPORATION OF NEW YORK.

ELECTRIC MOTOR.

1,227,400.  Specification of Letters Patent.  Patented May 22, 1917.

Application filed March 25, 1914. Serial No. 827,081.

*To all whom it may concern:*

Be it known that I, MICHAEL DOLIVO-DOBROWOLSKY, a citizen of the Swiss Republic, residing at Wilmersdorf, Germany, have invented certain new and useful Improvements in Electric Motors, of which the following is a specification.

My invention relates to electric motors and particularly to electric motors employed directly as time keeping mechanisms, or for driving clock mechanisms. An electric motor for use as a time keeping mechanism should run at substantially constant speed, to give satisfactory results in practice. An ordinary series or shunt motor runs at constant speed only when its terminal voltage is constant. The object of my invention is, accordingly, to provide an electric motor with means for maintaining the revolutions of the motor substantially independent of voltage fluctuations. More particularly the object of my invention is to provide a novel construction of direct current motor for operation substantially without load and at a speed substantially independent of voltage fluctuations.

Figure 1:
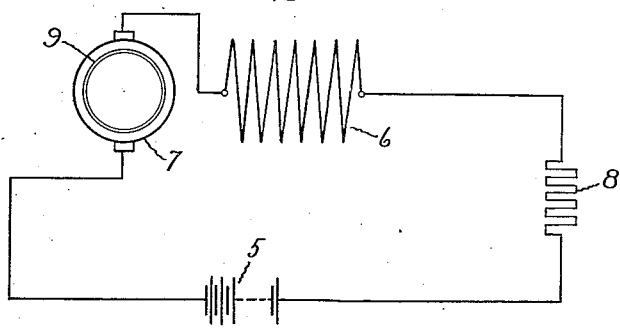
Figure 2:
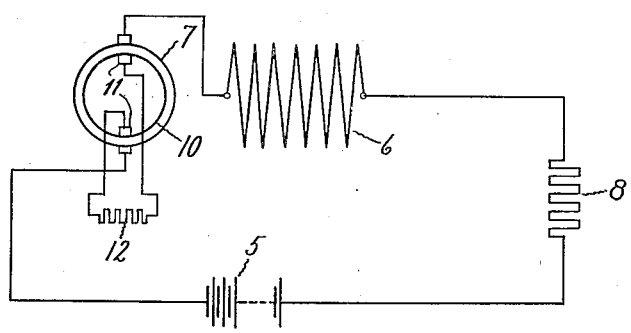
Figure 3:
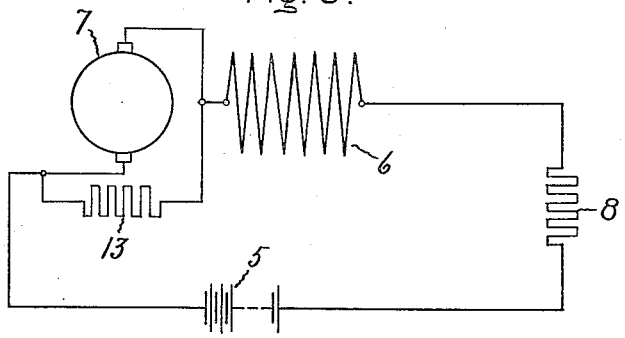

The features of novelty of my invention which I believe to be patentable are definitely indicated in the claims appended hereto. The principle of my invention and its operative embodiment in an electric motor will be understood from the following description taken in connection with the accompanying drawings, in which Figure 1 illustrates diagrammatically the application of my invention to an electric motor; Fig. 2 shows a modified form of the invention, and Fig. 3 a further modification of the invention.

An electric motor for operation as a time keeping mechanism is called upon to do a substantially negligible amount of external work. It is necessary, therefore, to neutralize the work produced in the motor armature in some manner so that the resultant work given out or performed by the motor will be very small, and only sufficient to drive the ordinary gear train of the clock mechanism. In carrying out my invention I provide the motor with means for imposing thereon an artificial load of such a character that the revolutions of the motor are substantially independent of voltage fluctuations. According to my invention this artificial load is in the nature of a generator action and may be produced by the rotation of an auxiliary armature in the motor field or by certain modified connections of the main armature winding.

Fig. 1 of the drawings diagrammatically illustrates a direct current series motor embodying one form of my invention. A source of direct current power 5 supplies current to the motor. The motor has a field winding 6 of usual construction and a commuted armature winding 7. In series with the motor is connected a comparatively large resistance 8 so that the current in the circuit is proportional to the terminal voltage. The field winding 6 is, therefore, excited by a current which is proportional to the terminal voltage. Under these conditions the driving torque of the motor is proportional to the square of the terminal voltage.

The rotor of the motor is provided with an auxiliary armature 9 arranged within the influence of the motor field. The auxiliary armature 9 is constructed in the form of a squirrel cage armature, a copper drum, or the like, and rotating with the rotor of the motor in the motor field places a load upon the motor. The auxiliary armature is in substance a damping armature and the damping torque is proportional to the square of the terminal voltage and the speed at which the armature rotates in the motor field. If, therefore, the mechanical friction and other disturbing influences are very small, the motor adjusts itself to a speed which is independent of the terminal voltage.

In the form of my invention diagrammatically illustrated in Fig. 2 the auxiliary armature 10 is a commuted winding provided with coöperating brushes 11. The auxiliary armature is locally short-circuited in this case by a resistance 12 connected across the brushes 11. By the use of the external resistance 12 the heat developed by the action of the auxiliary armature can be largely radiated outside the motor, thus preventing undue heating of the armature of the motor.

A little consideration of Fig. 2 will show that the auxiliary armature can be entirely eliminated, in which case the main armature winding performs the functions of the motor armature and the damping or generator armature. This form of my invention is diagrammatically illustrated in Fig. 3 of the drawings. The motor armature is locally short-circuited through a resistance 13. The magnitude of the resistance is designed to give the motor good starting characteristics. If mechanical friction and similar losses are neglected then a motor so connected has at starting exactly the same properties as the motor hereinbefore described.

Various changes and modifications in the application of my invention to electric motors for time keeping mechanisms will be apparent to those skilled in the art. I do not wish to limit myself to the specific constructions herein illustrated by way of examples, but aim by the appended claims to cover all modifications within the spirit and scope of my invention.

What I claim as new and desire to secure by Letters Patent of the United States, is,—

1. The combination with an electric motor and a source of electric energy therefor, of means whereby the field of the motor is substantially proportional to the voltage of said source, and means associated with the rotor of the motor and within the influence of the motor field for producing a damping action on the rotor approximately proportional to the square of the voltage of said source whereby the revolutions of the motor are substantially independent of voltage fluctuations of said source.

2. The combination with an electric motor and a source of electric energy therefor, of means whereby the field of the motor is substantially proportional to the voltage of said source, and means associated with the rotor of the motor and within the influence of the motor field for producing by the rotation of the rotor in the motor field a generator action of such a character that the revolutions of the rotor are substantially independent of voltage fluctuations of said source.

3. The combination with an electric motor adapted in normal operation to perform little external work and a source of electric energy therefor, of means whereby the field of the motor is substantially proportional to the voltage of said source, and means associated with the rotor of the motor whereby the rotation of the rotor in the motor field causes a load to be placed on the motor approximately proportional to the square of the voltage of said source whereby the revolutions of the motor are substantially independent of voltage fluctuations.

4. The combination with a direct current motor adapted for operation at constant speed and substantially without load and a source of electric energy therefor, of means whereby the field of the motor is substantially proportional to the voltage of said source, and means operatively related to the rotor of the motor whereby the rotation of the motor causes a load to be placed thereon of such a character that fluctuations in the voltage of said source produce substantially corresponding and balancing variations in the motor torque and in said load.

5. The combination with an electric motor adapted in normal operation to perform little external work and a source of electric energy therefor, of means whereby the exciting field of the motor is substantially proportional to the voltage of said source, and a locally short-circuited auxiliary armature winding mounted within the influence of the exciting field of the motor and adapted to impose a load on the motor approximately proportional to the square of the voltage of said source whereby the revolutions of the motor are substantially independent of voltage fluctuations of said source.

6. The combination with an electric motor adapted in normal operation to perform little external work and having a field winding and a main armature winding and a source of electric energy therefor, of means whereby the field of the motor is substantially proportional to the voltage of said source, and an auxiliary armature winding mounted within the influence of the motor field and arranged to impose a load upon the motor approximately proportional to the square of the voltage of said source whereby the revolutions of the motor are substantially independent of voltage fluctuations of said source.

7. The combination with a direct current motor adapted for operation at constant speed and substantially without load having a field winding and a main armature winding and a source of electric energy therefor, of means whereby the field of the motor is substantially proportional to the voltage of said source, and an auxiliary armature winding locally short-circuited and mounted within the influence of the motor field and adapted by generator action to impose a load on the motor of such a character that the revolutions of the motor are substantially independent of the voltage fluctuations of said source.

In witness whereof, I have hereunto set my hand this sixth day of March, 1914.

MICHAEL DOLIVO-DOBROWOLSKY.

Witnesses:
WALTER COHN-BYK,
VALENTIN KNOEH.